United States Patent [19]
Danmoto et al.

[11] Patent Number: 4,896,431
[45] Date of Patent: Jan. 30, 1990

[54] ALIGNMENT APPARATUS

[75] Inventors: Shojiro Danmoto, Ushiku; Hachiro Sato, Abiko; Fumio Kanno, Tsuchiura, all of Japan

[73] Assignee: Canon Kabushiki Kaisha, Tokyo, Japan

[21] Appl. No.: 266,071

[22] Filed: Nov. 2, 1988

[30] Foreign Application Priority Data

Nov. 6, 1987 [JP] Japan .................. 62-279347
Nov. 6, 1987 [JP] Japan .................. 62-279348
Nov. 6, 1987 [JP] Japan .................. 62-169088
Oct. 6, 1988 [JP] Japan .................. 63-130460

[51] Int. Cl.$^4$ ............................................. G01B 5/25
[52] U.S. Cl. .......................................... 33/644; 33/520
[58] Field of Search .............. 33/644, 645, 520, 286, 33/832, 833; 29/407; 901/30, 39, 45; 414/751

[56] References Cited

U.S. PATENT DOCUMENTS

| | | |
|---|---|---|
| 3,824,674 | 7/1974 | Inoyama et al. . |
| 4,098,001 | 7/1978 | Watson . |
| 4,179,783 | 12/1979 | Inoyama et al. . |
| 4,609,325 | 9/1986 | Gabrielli . |
| 4,627,169 | 12/1986 | Zafred ........................... 33/644 X |
| 4,803,786 | 2/1989 | Cusack ........................... 33/644 |

FOREIGN PATENT DOCUMENTS 57-168840 10/1982 Japan .
61-34932  8/1986 Japan .
62-102990 5/1987 Japan .

Primary Examiner—Harry N. Haroian
Attorney, Agent, or Firm—Fitzpatrick, Cella, Harper & Scinto

[57] ABSTRACT

An alignment apparatus is interposed between a machine body and a terminal body attached to the machine body and performs alignment therebetween to have a predetermined compliance. The apparatus includes a mounting body connected to the machine body, with the mounting body and the terminal body having opposing surfaces, a first shaft member engaged with an engaging portion formed on the opposing surface of the mounting body, and a second shaft member engaged with an engaging portion formed on the opposing surface of the terminal body. The second shaft member is located on an identical axis to the first shaft member. A plurality of pin members are disposed around the first and second shaft members to surround them, and biasing members apply a tightening force to the plurality of pin members.

8 Claims, 15 Drawing Sheets

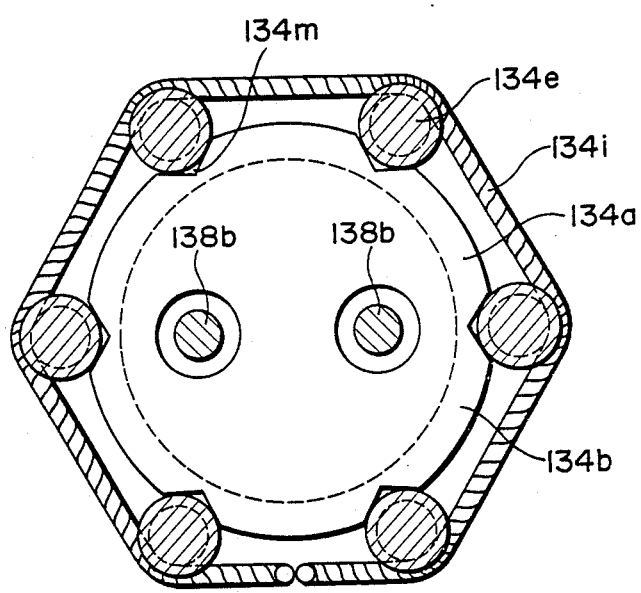
F I G. 13

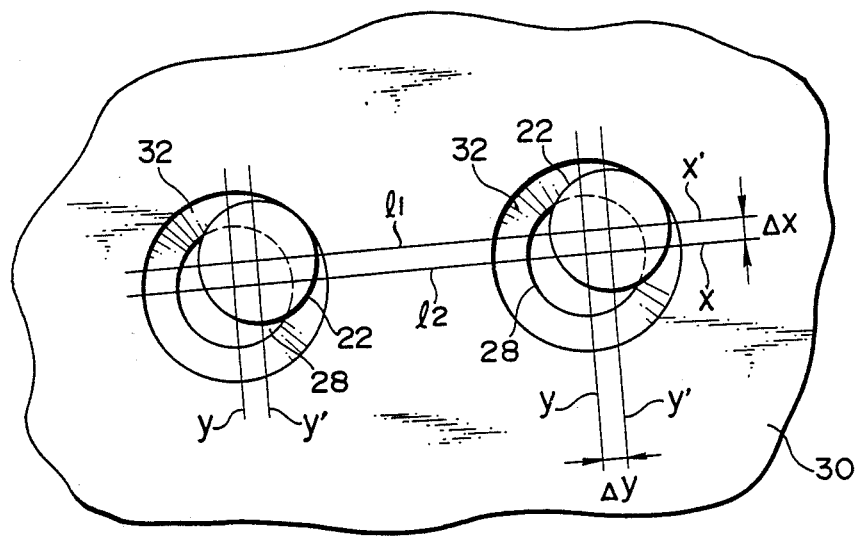
F I G. 14A
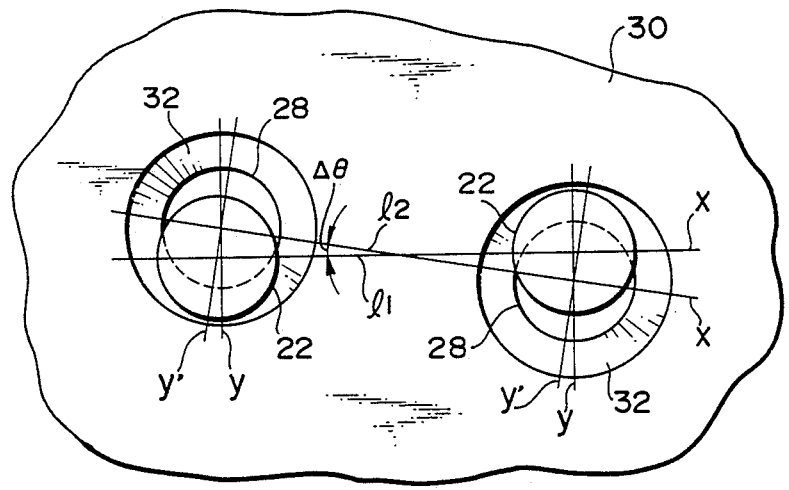
F I G. 14B

ALIGNMENT APPARATUS

BACKGROUND OF THE INVENTION

The present invention relates to an alignment apparatus which is interposed between a machine main body such as a robot and a terminal body such as a finger device, a hand device, or the like, and performs alignment therebetween to have a predetermined compliance.

As a conventional alignment apparatus used in an assembly robot as an automatic assembly apparatus, Japanese Patent Publication No. 61-34932 discloses an apparatus which couples a robot main body and a finger device using a plurality of leaf springs, and utilizes elasticity of these leaf springs. Japanese Patent Laid-Open (Kokai) Nos. 57-168840 and 62-103990, and U.S. Pat. No. 3,824,674 disclose arrangements wherein a robot main body and a finger device are coupled using coil springs in place of the leaf springs.

The alignment apparatus is required to have an arrangement of allowing deviations of the robot and the finger device and of recovering the deviations. U.S. Pat. Nos. 4,609,325, 4,179,783 and 4,098,001 disclose arrangements in which deviations of the robot and the finger device are allowed and recovered using a bearing means and an elastic member.

Such conventional alignment apparatuses employ springs having directivity of deviation. For this reason, the deviating direction of the finger device is limited. In the conventional alignment apparatus, in order to carry out a precise alignment operation, the arrangement becomes complicated.

An assembly operation of articles by a robot has merit since it can be performed at high speed and high precision within a unit time. When such a high-speed operation is carried out, assembly positions of an article gripped by the finger device and a corresponding member are shifted from each other. For this reason, the finger device is deviated relative to a robot arm to execute the assembly operation. Upon completion of the assembly operation, the finger device is recovered to an original position. The time required for the recovery operation of the finger device and the time required for completely stopping the finger device are preferably short. In particular, if the stopping time is long, the next operation of the robot becomes unstable.

SUMMARY OF THE INVENTION

The present invention has been made in consideration of the above situation, and has as its main object to provide an alignment apparatus capable of precisely performing an assembly operation even if assembly positions of a gripped article and a corresponding member do not coincide with each other, and even if their central positions are offset from each other when an article is gripped by a finger device and a robot is moved to an assembly position of the article to assemble the article in a corresponding member.

To attain the above-mentioned object, according to one aspect of the present invention, there is provided an alignment apparatus which is interposed between a machine body and a terminal body attached to the machine body. The alignment apparatus performs alignment therebetween with a predetermined compliance, and comprises: a mounting body connected to the machine body, the mounting body and the terminal body having opposing surfaces; a first shaft member engaged with an engaging portion formed on the opposing surface of the mounting body; a second shaft member engaged with an engaging portion formed on the opposing surface of the terminal body, the second shaft member being located on an identical axis to the first shaft member; a plurality of pin members disposed around the first and second shaft members to surround the first and second shaft members; and compression means for applying a tightening force to the plurality of pin members.

To attain the above-mentioned object, according to the other aspect of the present invention, there is provided an alignment apparatus which is interposed between a machine body and a terminal body attached to the machine body. The alignment body performs alignment therebetween with a predetermined compliance, and comprises: a first shaft portion connected to the machine body; a second shaft portion connected to the terminal body; a plurality of pin members disposed to surround outer surfaces of the first and second shaft portions; and compression means for applying a tightening force toward the center of the first and second shaft portions to the pin members.

It is another object of the present invention to provide an alignment apparatus which can be deviated along the entire circumference of a circle defined by the central lines of a robot and a finger device and can perform a precise alignment operation.

It is still another object of the present invention to provide an alignment apparatus which can carry out a precise alignment operation with a simple arrangement.

It is a further object of the present invention to provide an alignment apparatus which can shorten a stopping time of a finger device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a cross-sectional view taken along a line XIII—XIII of the alignment apparatus shown in FIG. 12;

FIG. 14A is a plan view showing a case wherein two shafts are deviated in a parallel state;

FIG. 14B is a plan view showing a case wherein two shafts are deviated in a point symmetrical state;

DETAILED DESCRIPTION OF THE PREFERRED EMBODIMENTS

Figure 1:
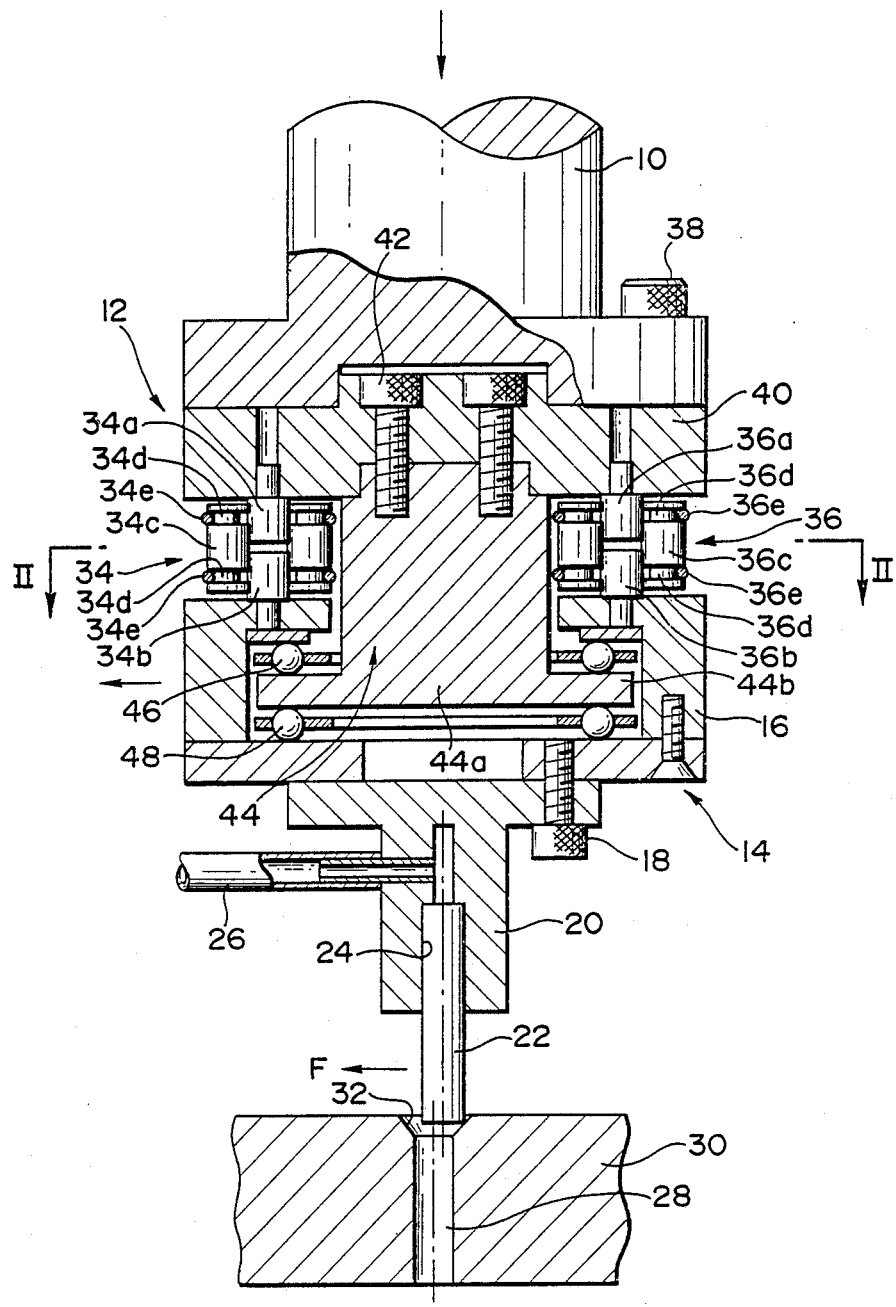
FIG. 1 is a longitudinal sectional view showing an arrangement of a first embodiment of an alignment apparatus according to the present invention in a state wherein the apparatus is attached to the distal end of a robot arm.

An arrangement of a first embodiment of an alignment apparatus according to the present invention will be described in detail hereinafter with reference to FIGS. 1 to 4B. FIG. 1 shows a state wherein a hand portion 14 is attached to the distal end of a robot arm 10 constituting a part of an automatic assembly apparatus through an alignment apparatus 12 of the first embodiment. The robot arm 10 can be freely moved in a right-and-left direction (x-direction) in FIG. 1, a direction perpendicular to the drawing surface (y-direction), and an up-and-down direction (z-direction) by a drive mechanism (not shown).

The hand portion 14 comprises a hand body 16 which has an upper circular opening portion having a first diameter in the upper surface and in which a cylindrical hollow portion having a second diameter larger than the first diameter is formed, and a holding member 20 fixed to the lower surface of the hand body 16 through a bolt 18. An insertion hole 24 in which a round-rod pin 22 is inserted as a fitting member and which extends vertically and is open to the lower surface of the holding member 20 is formed in the lower portion of the holding member 20. A suction pipe 26 connected to a suction pump (not shown) communicates with and is connected to the upper portion of the insertion hole 24. Upon driving of the suction pump, the interior of the insertion hole 24 is maintained in a negative pressure state, and the pin 22 is drawn by suction in the insertion hole 24 by the negative pressure.

A fitting hole 28 in which the pin 22 is fitted is formed in a substrate 30 as a receiving member. The substrate 30 is horizontally chucked on a base (not shown). In this state, the fitting hole 28 extends vertically. Note that a tapered surface 32 having a predetermined slope with respect to a horizontal plane is formed on the upper peripheral edge of the fitting hole 28 to facilitate insertion of the pin 22.

The alignment apparatus 12 of the first embodiment comprises a pair of compliance units 34 and 36 symmetrically disposed about the central axis of the robot arm 10. The alignment apparatus 12 comprises a disc-like mounting body 40 fixed to the lower end of the robot arm 10 through a bolt 38 and a support body 44 fixed to the lower surface of the mounting body 40 through a bolt 42.

The support body 44 is constituted by a columnar portion 44a having a third diameter smaller than the first diameter described above at its central portion, and a flange portion 44b having a fourth diameter larger than the first diameter and smaller than the second diameter. With this structure, the hand body 16, the holding member 20 of which is fixed, is suspended from the support body 44 fixed to the lower end of the robot arm 10.

The upper surface of the flange portion 44b is in contact with the upper surface of the hollow portion of the hand body 16 through a first ball bearing 46 to be pivotal and movable in a horizontal plane. The lower surface of the flange portion 44b is in contact with the lower surface of the hollow portion of the hand body 16 through a second ball bearing 48 to be pivotal and movable in the horizontal plane. In this manner, the holding member 20 is supported to be freely movable and pivotal in the horizontal plane with respect to the robot arm 10.

The pair of compliance units 34 and 36 are set as follows. When no external force is applied to the holding member 20 in a normal state, the units 34 and 36 elastically maintain a state wherein the central axis of the robot arm 10 is aligned with the central axis of the holding member 20 in the vertical direction. When an external force in the horizontal plane is applied to the holding member 20, the units 34 and 36 allow flexible deviation in the horizontal plane within a predetermined range in accordance with the external force.

Figure 2:
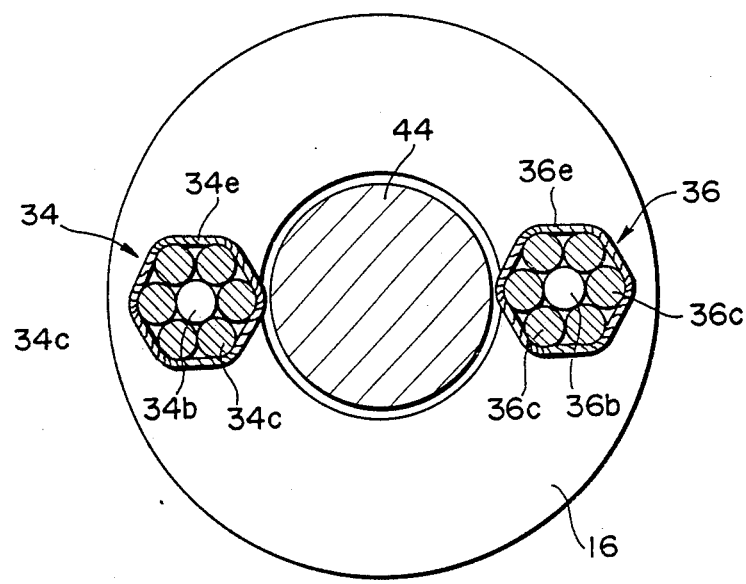
FIG. 2 is a cross-sectional view taken along a line II—II of the alignment apparatus shown in FIG. 1.

The arrangements of the compliance units 34 and 36 as the characteristic feature of this embodiment will be explained below. Since the compliance units 34 and 36 are located on opposing positions on the circumference of an identical circle to have the central axis of the robot arm 10 as the center, in other words, on an identical diameter, as shown in FIG. 2, and have the same arrangement. For this reason, the arrangement of only the left compliance unit 34 in FIG. 2 will be described in detail, and a description of the arrangement of the right compliance unit 36 in FIG. 2 will be omitted by attaching similar suffixes to reference numerals of its components.

The compliance unit 34 comprises a first shaft member 34a which is mounted on the lower surface of the mounting body 40 to project downward, and a second shaft member 34b which is mounted on the upper surface of the hand body 16 to project upward in a state wherein it is aligned with the first shaft member 34a in the vertical direction while no external force is applied to the holding member 20.

The first and second shaft members 34a and 34b are formed to have outer circumferential surfaces having the same radii. The lower end of the first shaft member 34a opposes the upper end of the second shaft member 34b to be separated at a small distance.

The compliance unit 34 comprises a plurality of support pins 34c as support members disposed to simultaneously surround the opposing end portions of the first and second shaft members 34a and 34b. More specifically, each support pin 34c is formed of a columnar body having the same radius as that of the first and second shaft members 34a and 34b. The number of the support pins 34c is six. The six support pins 34c are disposed to simultaneously surround the opposing end portions of the first and second shaft members 34a and 34b without any gap.

Annular grooves 34d are formed in the upper and lower end portions of each support pin 34c. In a state wherein these support pins 34c surround the shaft members 34a and 34b, ring-shaped biasing members 34e for biasing these support pins to be elastically pressed against the circumferential surfaces at the opposing end portions of the first and second shaft members 34a and 34b are respectively housed in the grooves 34d to simultaneously surround these support pins 34c.

In the first embodiment, each biasing member 34e is formed of a ring-shaped coil spring having a large number of turns.

The alignment operation of the alignment apparatus 12 with the above structure will be explained below.

The robot arm 10 is controlled and moved by a control mechanism (not shown) so that the pin 22 is fitted in the fitting hole 28 formed in the substrate 30 while the pin 22 is chucked and held by the holding member 20. More specifically, position data of the fitting hole 28 on an x-y plane, and three-dimensional position of the robot arm 10, i.e., the position data of the pin 22 to be fitted are input beforehand in this control mechanism. The robot arm 10 is controlled and moved by the control operation of the control mechanism based on these position data.

When these position data are accurate, the robot arm 10 is moved according to the control content of the control mechanism, and the fitting hole 28 is aligned according to a setting value, the pin 22 is moved to a position immediately above the fitting hole 28, and is moved vertically downward, so that the pin 22 can be fitted in the fitting hole 28 without any problem.

The positioning of the fitting hole 28 is often not accurate and the fitting hole is slightly offset from the setting value in the x-y plane or the position of the robot arm 10 is often slightly offset from a position defined by the control mechanism due to an error of a drive system, e.g., a backlash of gears.

Figure 3:
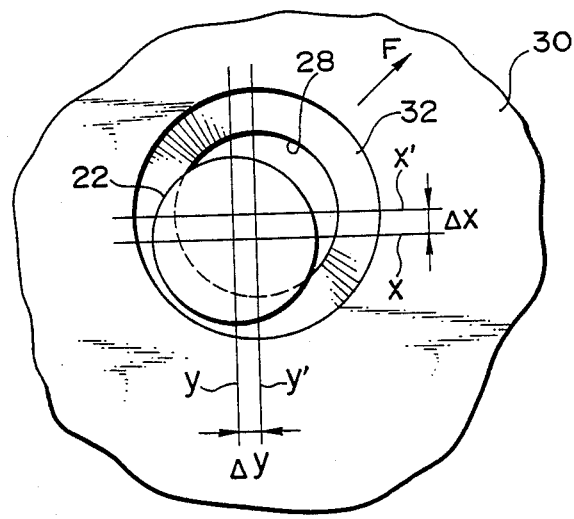
FIG. 3 is a plan view showing an offset state between a pin and a fitting hole on an x-y plane.

When such an offset occurs, the lower edge of the pin 22 which is moved vertically downward upon downward movement of the robot arm 10 abuts against the tapered surface 32 of the fitting hole 28, as shown in FIGS. 1 and 3. When the robot arm 10 is further moved downward, the lower edge of the pin 22 receives a horizontal partial force F acting along the tapered surface 32.

Figure 4A:
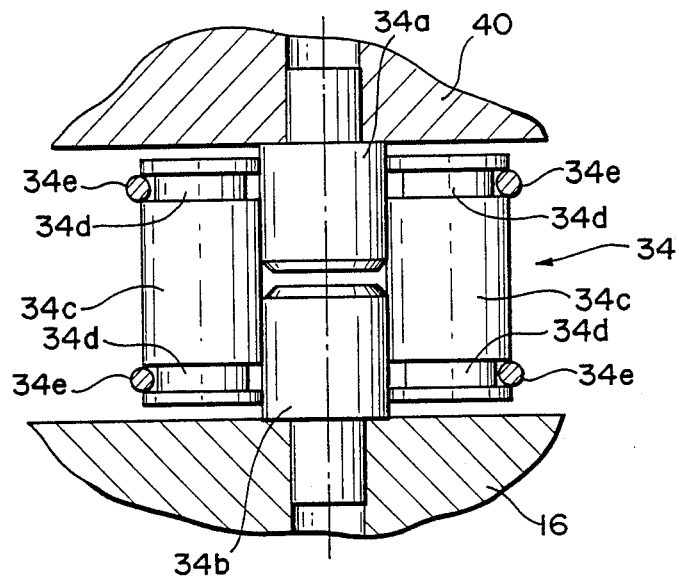
FIG. 4A is a partial front view showing a state wherein first and second shaft members are aligned with each other.

In a state wherein no partial force F acts, the first and second shaft members 34a; 34b and 36a; 36b are elastically aligned in the vertical direction by the pairs of upper and lower biasing members 34e; 36e, as shown in FIG. 4A. When the horizontal partial force F acts on the pin 22 in this state, it acts on the second shaft members 34b and 36b of the compliance units 34 and 36 through the holding member 20 and the hand body 16. Then, the support pins 34c; 36c are obliquely inclined against the biasing force of these biasing members 34e; 36e, so that the second shaft members 34b; 36b are moved and deviated in the horizontal direction, as shown in FIG. 4B.

Figure 4B:
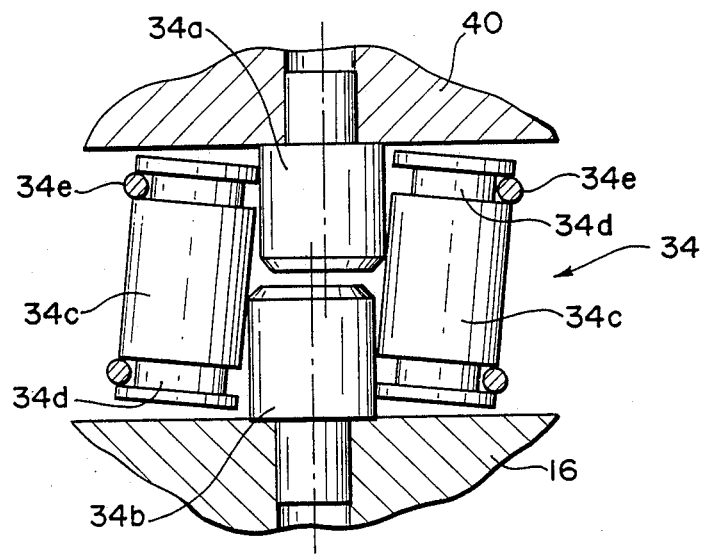
FIG. 4B is a partial front view showing a state wherein the first and second shaft members are deviated from each other so as to absorb an offset between the pin and the fitting hole.

Note that when the shaft members are moved in the horizontal direction, the hand body 16 to which the second shaft member 34b is attached is moved while supporting the pin 22 to project it vertically without any inclination, as shown in FIG. 4B. For this reason, the following fitting operation can be very easily performed.

In this manner, an offset between the pin 22 and the fitting hole 28 can be elastically absorbed by deviation of the first and second shaft members 34a; 34b and 36a; 36b of the compliance units 34 and 36, respectively, so that the pin 22 and the fitting hole 28 are vertically aligned. Therefore, upon downward movement of the robot arm 10, the pin 22 can be fitted in the fitting hole 28 smoothly.

After the pin 22 is fitted in the fitting hole 28, a suction pump (not shown) is stopped, and the robot arm 10 is moved upward. Then, the holding state of the pin 22 on the holding member 20 is released, and the hand portion 14 alone is moved upward while releasing the pin 22. The above-mentioned partial force F is stopped when the pin 22 is completely separated from the holding member 20. As a result, the partial force acting on the second shaft members 34b and 36b of the compliance units 34 and 36 is canceled, and the second shaft members 34b and 36b are recovered from a deviated state shown in FIG. 4B to an aligned state shown in FIG. 4A.

In this manner, the alignment operation in the alignment apparatus 12, i.e., an elastic deviation/recovery operation of the compliance units 34 and 36 is completed.

The present invention is not limited to the arrangement of the first embodiment mentioned above, and various changes and modifications may be made within the spirit and scope of the invention.

Various other embodiments and modifications will be explained below. The same reference numerals in the following description denote the same parts as in the first embodiment, and a detailed description thereof will be omitted.

In the first embodiment described above, the pin 22 is chucked in the insertion hole 24 formed in the holding member 20 by vacuum suction. However, the present invention is not limited to this. For example, the pin 22 can be magnetically chucked using a magnet or may be mechanically locked using mechanical fingers.

In the first embodiment, the hand body 16 of the hand portion 14 and the support body 44 of the robot arm 10 are rotatably supported by the first and second bearings 46 and 48. However, the present invention is not limited to this arrangement. For example, these components may be supported by air bearings.

In the compliance units 34 and 36 of the first embodiment, the ring-shaped coil springs are employed as the biasing members 34e and 36e. However, the present invention is not limited to this arrangement. For example, ring-shaped elastic rubber bands may be employed. In this case, the grooves 34d and 36d need not be formed in the support pins 34c and 36c as compared to the case wherein the ring-shaped coil springs are used.

If the width of the ring-shaped elastic rubber band is increased, only a single rubber band need be arranged in place of a pair of upper and lower rubber bands.

The alignment apparatus 12 of the first embodiment mentioned above does not comprise a lock means. As shown in a modification of the first embodiment shown in FIGS. 5 to 7, the apparatus may have the lock means.

Figure 5:
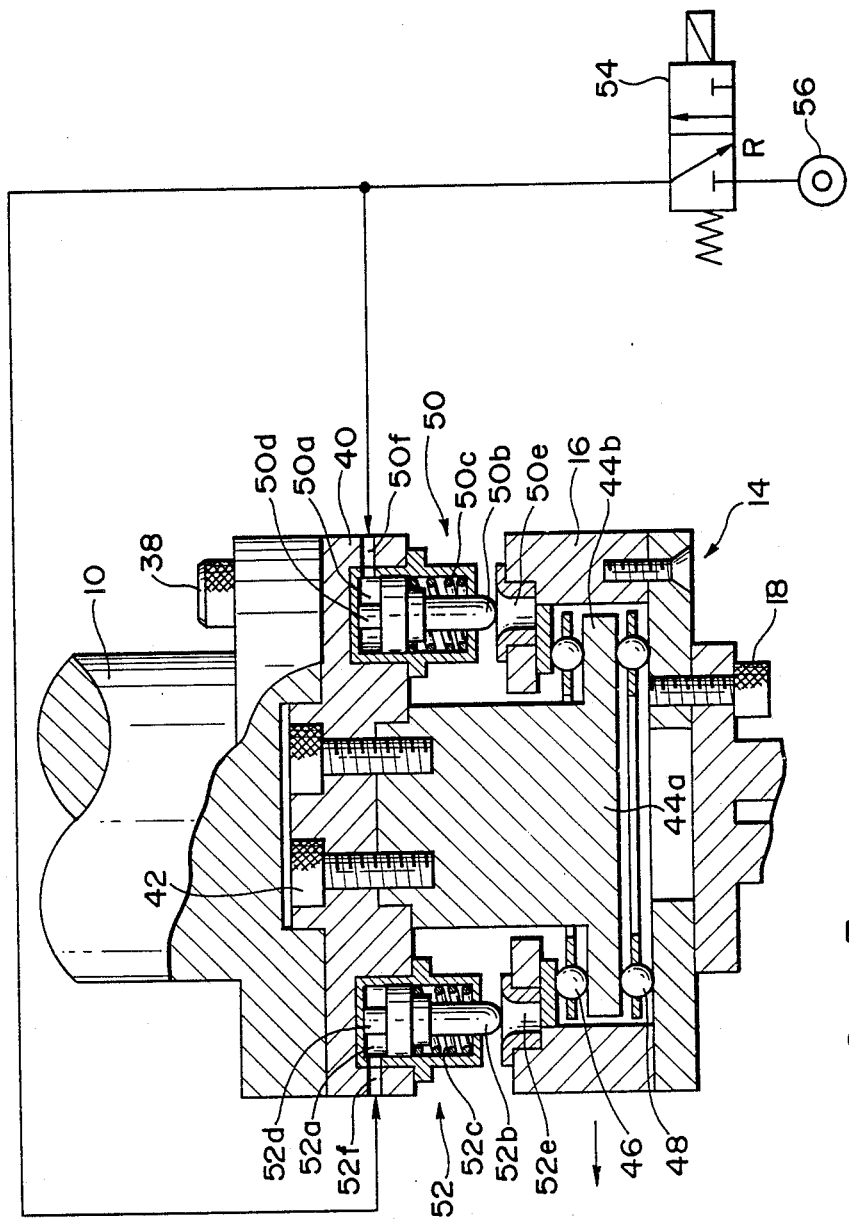
FIG. 5 is a longitudinal sectional view showing an arrangement of a modification of the alignment apparatus of the first embodiment in a state wherein the apparatus is attached to the distal end of the robot arm.

More specifically, the alignment apparatus 12 of this modification comprises a pair of lock mechanisms 50 and 52 as the lock means so as to prevent the hand body 16 from being deviated in a lateral direction with respect to the mounting body 40 due to its inertia when the robot arm 10 is moved at high speed in the lateral direction, as shown in FIG. 5.

Figure 6:
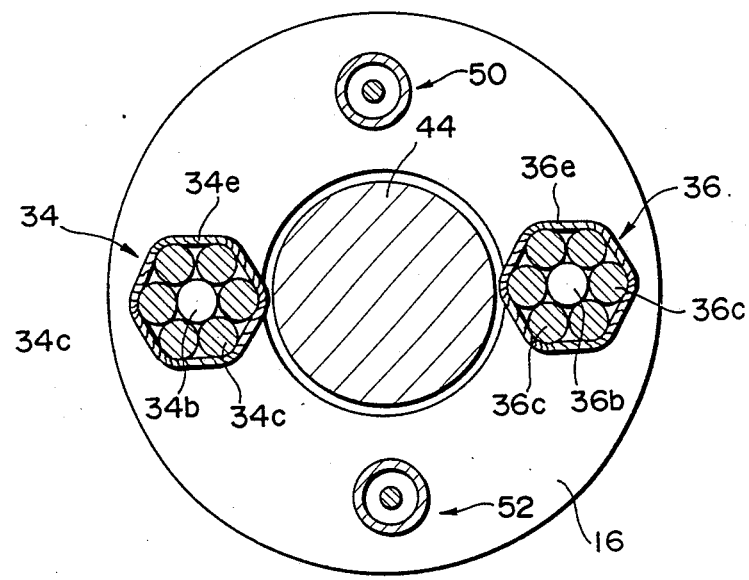
FIG. 6 is a cross-sectional view taken along a line VI—VI of the alignment apparatus shown in FIG. 5.

The lock mechanisms 50 and 52 are located to oppose each other on the circumference of the same circle as that of a circle along which the pair of compliance units 34 and 36 are disposed and on a diameter perpendicular to the predetermined diameter on which the compliance units 34 and 36 are located to have the central axis of the robot arm 10 as the center, and have the same arrangement, as shown in FIG. 6. For this reason, the arrangement of only the upper lock mechanism 50 in FIG. 6 will be described in detail below, and a description of the arrangement of the lower lock member 52 in FIG. 6 will be omitted by attaching similar suffixes to reference numerals of its components.

The lock mechanism 50 comprises a cylinder chamber 50a which is assembled in the mounting body 40. A piston member 50b which is extendable downward is housed in the cylinder chamber 50a. The piston member 50b is biased upward by a coil spring 50c. A stopper member 50d is integrally formed on the upper end of the piston member 50b and can project upward by the biasing force of the coil spring 50c. At a position where the stopper member 50d abuts against the upper surface of the cylinder chamber 50a and is stopped, the retracted position of the piston member 50b is defined.

A lock hole 50e in which the distal end of the corresponding piston member 50b is fitted is formed in the upper surface of the hand body 16 at a position opposing the distal end of the piston member 50b. A coupling pipe 50f coupled to a compression pump mechanism 56 through an electromagnetic valve 54 is connected to a portion of the cylinder chamber 50a above the upper end of the piston member 50b.

Figure 7:
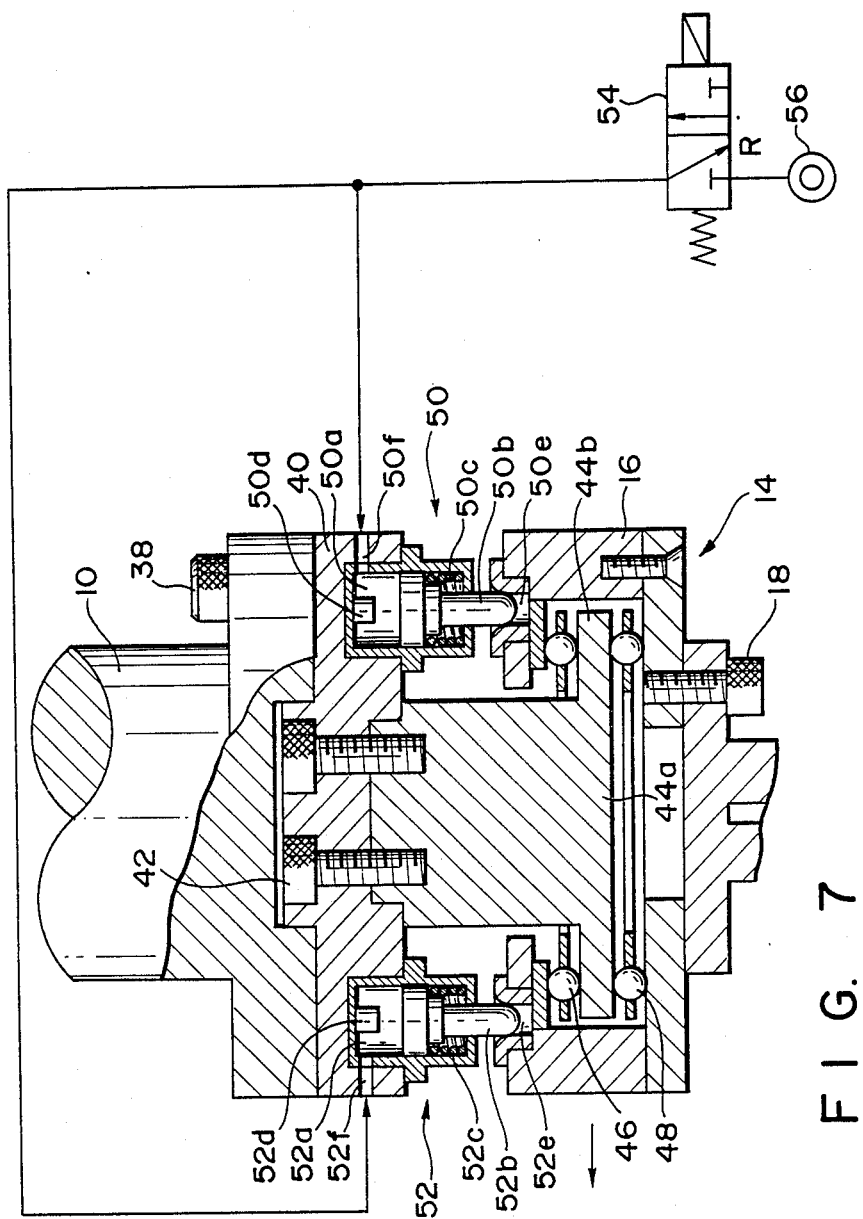
FIG. 7 is a longitudinal sectional view showing the alignment apparatus shown in FIG. 5 in a state wherein its lock mechanism performs a locking operation.

When the electromagnetic valve 54 is opened, compressed air is supplied from the compression pump mechanism 56 into the cylinder chamber 50a through the coupling pipe 50f, so that the piston member 50b is pressed downward from the retracted position against the biasing force of the coil spring 50c, and is deviated to a lock position, as shown in FIG. 7. At this lock position, the lower end of the piston member 50b is fitted in the corresponding lock hole 50e. When the lock mechanism 50 is operated in this manner, the hand body 16 and the mounting body 40 are laterally locked with each other and are laterally moved together.

The alignment operation of the alignment apparatus 12 with the above arrangement will be explained below.

The robot arm 10 is controlled and moved by a control mechanism (not shown) so that the pin 22 is fitted in the fitting hole 28 formed in the substrate 30 while the pin 20 is chucked and held by the holding member 20. More specifically, position data of the fitting hole 28 on an x-y plane, and three-dimensional position of the robot arm 10, i.e., the position data of the pin 22 to be fitted are input beforehand in this control mechanism. The robot arm 10 is controlled and moved by the control operation of the control mechanism based on these position data.

When the robot arm 10 is moved in the horizontal direction, i.e., in the x-y plane under the movement control, the electromagnetic valve 54 is opened, and compressed air is supplied from the compression pump mechanism 56 to the lock mechanisms 50 and 52. In this manner, the piston members 50b and 52b are pressed downward from their retracted positions against the biasing forces of the corresponding coil springs 50e and 52e, and are deviated to their lock positions, as shown in FIG. 7. In this manner, the lock mechanisms 50 and 52 are actuated and the piston members 50b and 52b are brought to the lock positions to be fitted in the corresponding lock holes 50e and 52e, so that the hand body 16 and the mounting body 40 are laterally locked and laterally moved together.

When the robot arm 10 is moved in the vertical direction, i.e., in the x-z or y-z plane under the movement control, the electromagnetic valve 54 is closed, and no compressed air is supplied from the compression pump mechanism 56 to the lock mechanisms 50 and 52. In this manner, the piston members 50b and 52b are pushed upward from the lock positions to the retracted positions by the biasing forces of the corresponding coil springs 50e and 52e, and are deviated to the retracted positions, as illustrated in FIG. 5.

In this manner, the lock mechanisms 50 and 52 are deactivated, and the piston members 50b and 52b are brought to the retracted positions to be withdrawn from the corresponding lock holes 50e and 52e, so that the hand body 16 and the mounting body 40 are brought to a state wherein they can be freely moved relative to each other in the lateral direction.

As described above, according to this modification, the pair of lock mechanisms 50 and 52 are arranged as the lock means, so that the hand portion 14 of the robot arm 10 can be integrally moved upon horizontal movement of the robot arm 10, thus preventing the hand portion 14 from being deviated.

Figure 9:
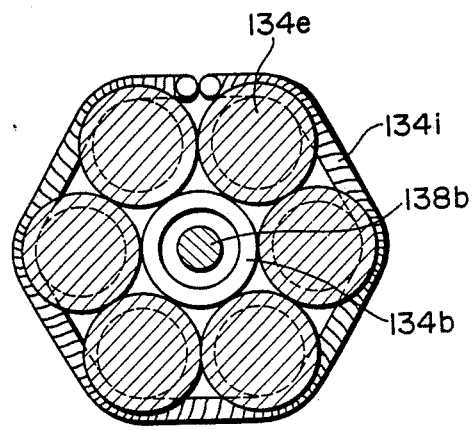
FIG. 9 is a cross-sectional view taken along a line IX—IX of the alignment apparatus shown in FIG. 8.
Figure 10:
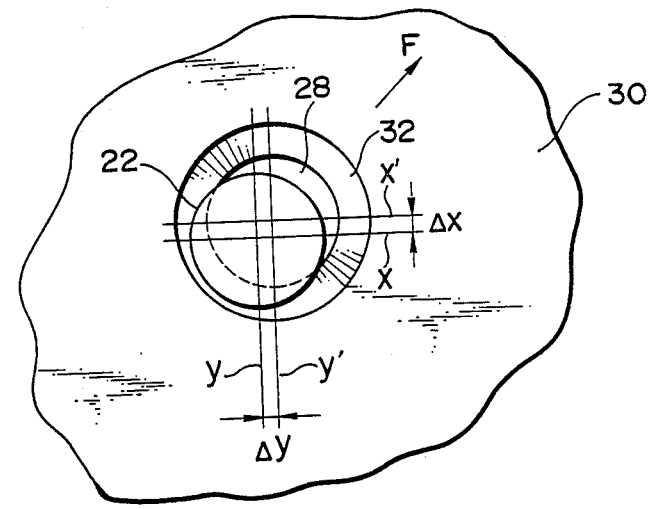
FIG. 10 is a plan view showing an offset state between a pin and a fitting hole on an x-y plane.

A second embodiment of an alignment apparatus according to the present invention will be described hereinafter with reference to FIGS. 8 to 10.

Figure 8:
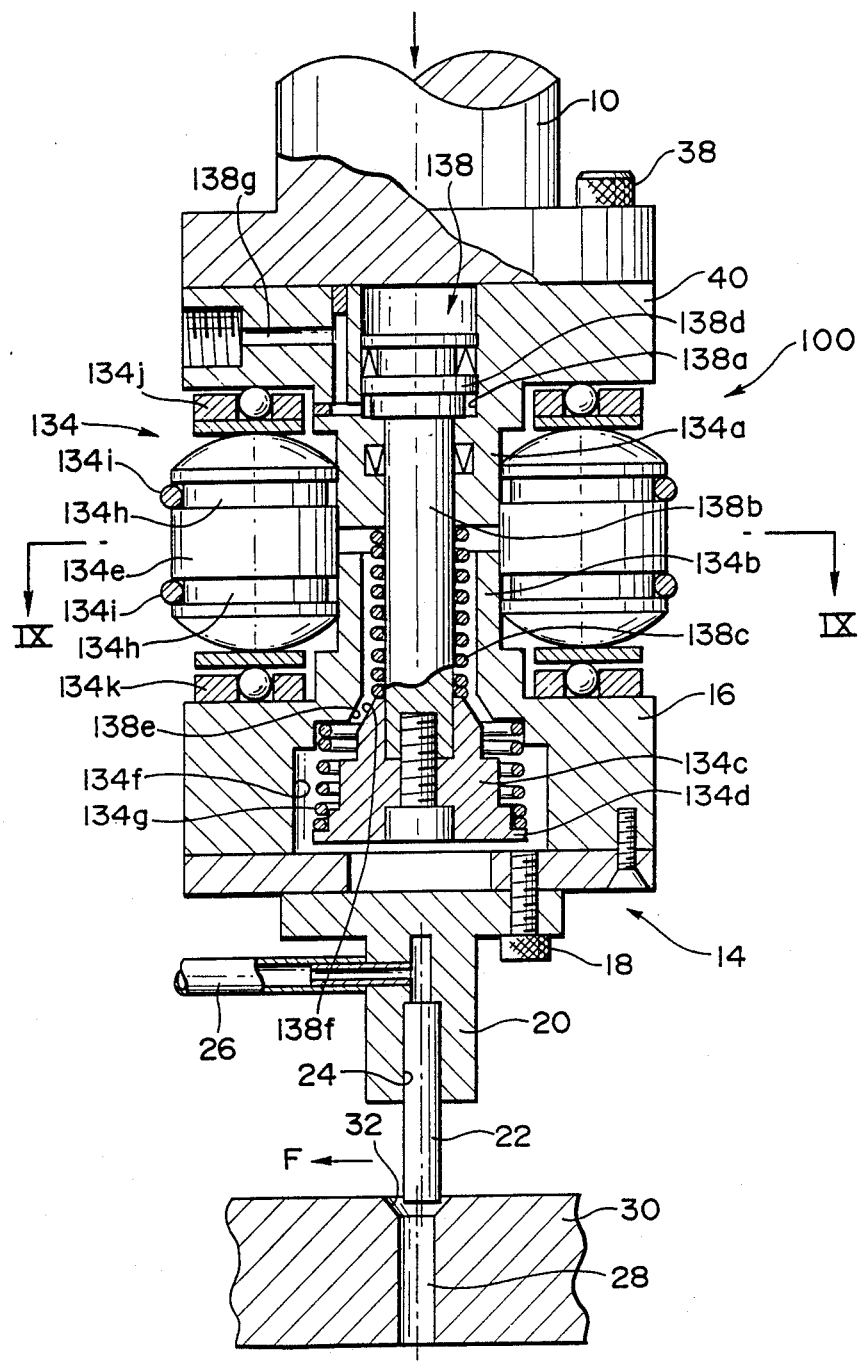
FIG. 8 is a longitudinal sectional view showing an arrangement of a second embodiment of an alignment apparatus according to the present invention in a state wherein the apparatus is attached to the distal end of the robot arm.

FIG. 8 illustrates a state wherein hand portion 14 is attached to the distal end of a robot arm 10 mentioned above through an alignment apparatus 100 of the second embodiment.

The alignment apparatus 100 of the second embodiment comprises a compliance unit 134 disposed to have a central axis coaxial with the central axis of the robot arm 10. When no external force is applied to a holding member 20 in a normal state, the compliance unit 134 elastically maintains a state wherein the central axis of the robot arm 10 is aligned with the central axis of the holding member 20 in the vertical direction. When an external force in a horizontal plane is applied to the holding member 20, the unit 134 allows flexible deformation in the horizontal plane within a predetermined range and inclination with respect to the vertical axis.

The arrangement of the compliance unit 134 as the characteristic feature of the second embodiment will be described hereinafter.

More specifically, the compliance unit 134 comprises a first shaft member 134a which is integrally formed on the lower surface of a mounting body 40 fixed to the lower end of the robot arm 10 to be coaxial with the central axis of the robot arm 10 and to extend downward. A second shaft member 134b is fixed to the upper surface of a hand body 16 through a bolt 38 to be coaxial with the central axis of the holding member 20 and to extend upward. The opposing end portions of the first and second shaft members 134a and 134b oppose each other to be separated at a predetermined distance.

A piston member 138b projects downward from the lower surface of the first shaft member 134a. A suspending member 134c is mounted on the lower end of the piston member 138b. An outer flange portion 134d is integrally formed on the lower end of the suspending member 134c. On the other hand, a stepped through hole 134f in which the suspending member 134c is complementarily fitted is formed in the hand body 16. As shown in FIG. 8, a coil spring 134g is interposed between the stepped portion of the second shaft member 134b defining the upper surface portion corresponding to the intermediate portion of the stepped through hole 134f and the outer flange portion 134d of the suspending member 134c. The coil spring 134g is arranged to elastically support the second shaft member 134b on the first shaft member 134a through the outer flange portion 134d and the suspending member 134c.

In this manner, the hand body 16 to which the second shaft member 134b is fixed is directly connected to the mounting body 40, to which the first shaft member 134a is mounted, so as to be elastically suspended. In the suspended state, pivotal movement of the hand body 16 about the central axis of the mounting body 40, i.e., an inclining operation about the central axis is allowed.

The compliance unit 134 comprises a plurality of support pins 134e disposed to simultaneously surround the opposing end portions of the first and second shaft members 134a and 134b. The first and second shaft members 134a and 134b and the support pins 134e have the same diameter.

The number of the support pins 134e is six. These six support pins 134e are disposed to simultaneously surround the opposing end portions of the first and second shaft members 134a and 134b without any gap.

Annular grooves 134h are formed in the upper and lower end portions of each support pin 134e. In a state wherein these support pins 134e surround the shaft members 134a and 134b, ring-shaped biasing members 134i for biasing these support pins 134e to be elastically pressed against the circumferential surfaces at the opposing end portions of the first and second shaft members 134a and 134b are respectively housed in the grooves 134h to simultaneously surround these support pins 134e, as shown in FIG. 9. In the second embodiment, each biasing member 134i is formed of a ring-shaped coil spring having a large number of turns.

As shown in FIG. 8, in order to allow pivotal movement of the hand body 16 about the central axis of the mounting body 40, the upper and lower end faces of each support pin 134e are rounded. The upper and lower end portions of each support pin 134e are rotatably engaged with the lower surface of the mounting body 40 and the upper surface of the hand body 16 through ball bearings 134j and 134k, respectively.

As shown in FIG. 8, the alignment apparatus 100 comprises a lock mechanism 138 for preventing the second shaft member 134b from being laterally deviated with respect to the first shaft member 134a due to its inertia when the robot arm 10 is moved at high speed in the lateral direction. The lock mechanism 138 comprises a cylinder chamber 138a extending in the first shaft member 134a along its central axis.

A piston member 138b is housed in the cylinder chamber 138a to be reciprocal along the central axis. The piston member 138b is biased downward by the coil spring 138c. At a position where a stepped portion 138d integrally formed on the upper end of the piston member 138b abuts against the lower surface of the cylinder chamber 138a, the non-lock position of the piston member is defined.

A tapered surface 138e tapered downward is formed on the stepped portion of the second shaft member 134b, which contacts the upper end of the coil spring 134g described above. A tapered surface 138f is formed on the edge portion of the outer flange portion 134d opposing the tapered surface 138e. The tapered surface 138f is engaged with the tapered surface 138e in a lifted state.

A coupling pipe 138g coupled to a compression pump mechanism (not shown) is connected to a portion of the cylinder chamber 138a below the stepped portion 138d of the piston member 138b. When compressed air is supplied from the compression pump mechanism to the cylinder chamber 138a through the coupling pipe 138g, the piston member 138b is pushed up from the non-lock position against the biasing force of the coil spring 138c, and is deviated to the lock position.

Note that at the lock position, the tapered surface 138f formed on the outer flange portion 138d of the piston member 138b is brought into contact with the tapered surface 138e formed on the second shaft member 134b. In this manner, when the lock mechanism 138 is actuated, the first and second shaft members 134a and 134b are locked in the lateral direction and are laterally moved together.

When the hand portion 14 is mounted on the distal end of the robot arm 10 through the alignment apparatus 100 having the compliance unit 134 with the above arrangement, a fitting operation for fitting a single pin 22 into a fitting hole 28 formed in a substrate 30 is executed in the same manner as in the first embodiment described above.

When the robot arm 10 is moved according to the control content of a control mechanism and the fitting hole 28 is aligned according to a setting value, the pin 22 is moved to a position immediately above the fitting hole 28, and is moved vertically downward, so that the pin 22 can be reliably fitted in the fitting hole 28.

When the positioning of the fitting hole 28 is not accurate and the fitting hole is slightly offset from the setting value in the x-y plane or the position of the robot arm 10 is slightly offset from a position defined by the control mechanism due to an error of a drive system, e.g., a backlash of gears, a so-called offset occurs.

In the second embodiment, assume that although the robot arm 10 side is precisely set, the fitting hole 28 is formed to be obliquely offset. If such an offset occurs, the lower edge the pin 22 which is moved downward upon downward movement of the robot arm 10 abuts against a tapered surface 32 of the fitting hole 28, as shown in FIGS. 8 and 10. When the robot arm 10 is further moved downward, the lower edge of the pin 22 receives a horizontal partial force F along the tapered surface 32.

Figure 11A:
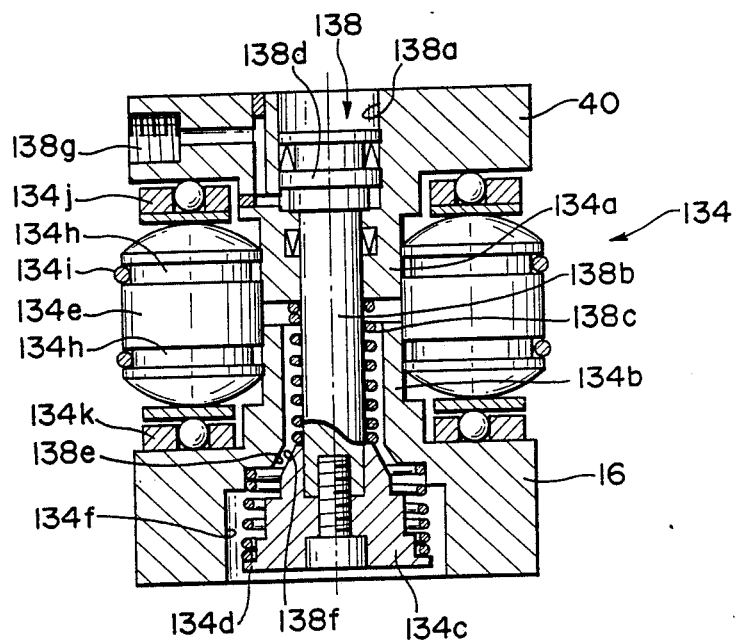
FIG. 11A is a partial front view showing a state wherein first and second shaft members are aligned with each other.
Figure 11B:
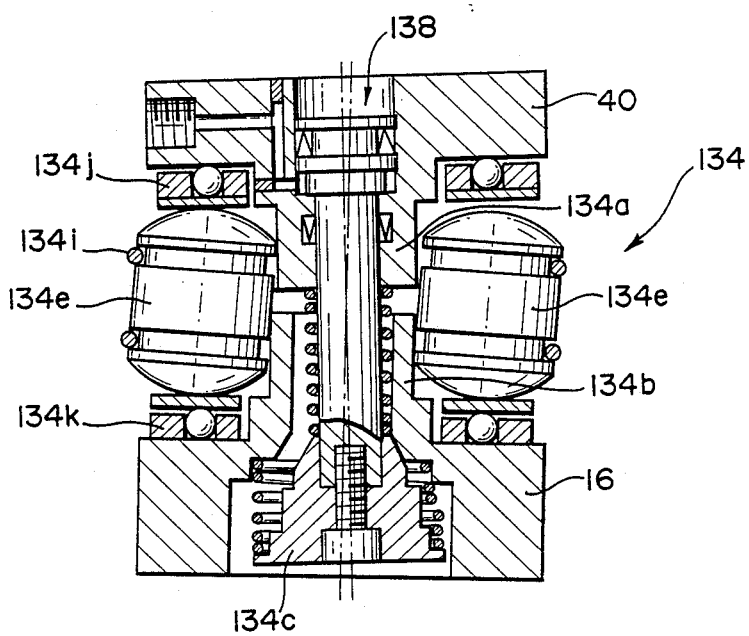
FIG. 11B is a partial front view showing a state wherein the first and second shaft members are deviated from each other so as to absorb an offset between the pin and the fitting hole.

In a state wherein no partial force F acts, the first and second shaft members 134a and 134b are elastically aligned in the vertical direction by the pair of upper and lower biasing members 134i, as shown in FIG. 11A. When the pin 22 receives the horizontal partial force F as described above, the partial force F acts on the second shaft member 134b of the compliance unit 134 through the holding member 20 and the hand body 16. From this state, the support pins 134e are obliquely inclined against the biasing forces of these biasing members 134i, so that the second shaft member 134b is moved and deviated in the horizontal direction, as shown in FIG. 11B.

In this compliance unit 134, the first and second shaft members 134a and 134b are arranged to be relatively pivotal about the central axis. As a result, the second shaft member 134b can be temporarily flexibly inclined with respect to the first shaft member 134a with respect to an inclination ($\alpha$) of the fitting hole 28 or the pin 22 from the central axis (z-axis). In this manner, in the compliance unit 134, the inclination (offset) of the fitting hole 28 or the pin 22 from the central axis can be satisfactorily absorbed, and the pin 22 can be reliably fitted in the fitting hole 28.

An oblique offset between the pin 22 and the fitting hole 28 can be absorbed by deviation and inclination of the first and second shaft members 134a and 134b in the compliance unit 134, and the central axis of the pin 22 is aligned with that of the fitting hole 28. Thus, upon downward movement of the robot arm 10, the pin 22 can be reliably fitted in the fitting hole 28.

After the pin 22 is fitted in the fitting hole 28, a suction pump (not shown) is stopped, and the robot arm 10 is moved upward. Then, the holding state of the pin 22 at the holding member 20 is released, and the hand portion 14 alone is moved upward while releasing the pin 22. The above-mentioned partial force F is stopped when the pin 22 is completely separated from the holding member 20. As a result, the partial force acting on the second shaft member 134b of the compliance unit 134 is canceled, and the second shaft member 134b is recovered by the biasing forces of the pair of upper and lower biasing members 134i from a deviated state shown in FIG. 11B to an aligned state shown in FIG. 11A.

As described above, the alignment apparatus 100 of the second embodiment can be deviated to have a compliance in correspondence with the inclination ($\alpha$) with respect to the z-axis as well as an offset in the x- and y-directions, and when a partial force caused by such inclination or offset is canceled, it can be reliably recovered to an original aligned state.

Figure 12:
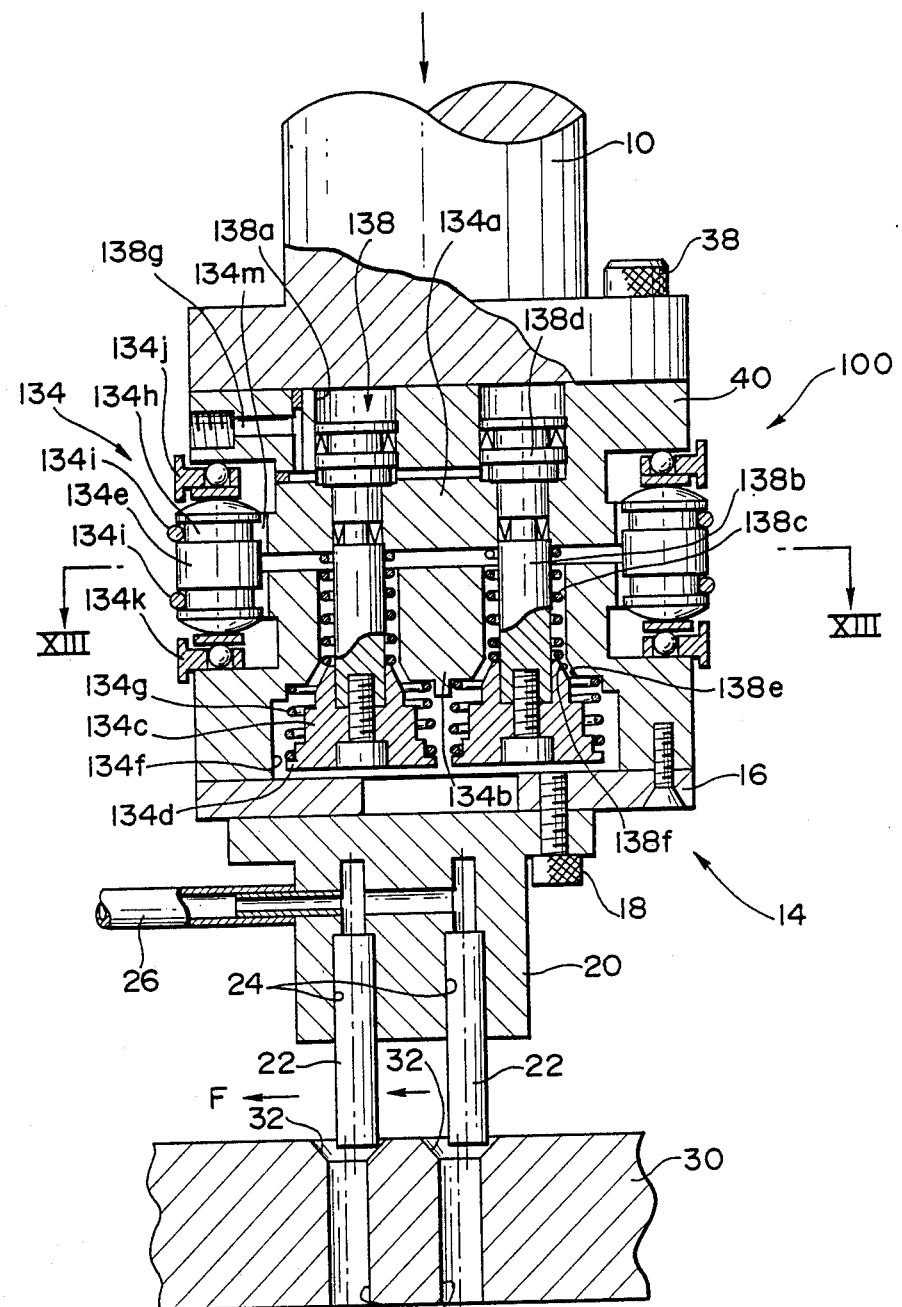
FIG. 12 is a longitudinal sectional view showing an arrangement of a modification of the alignment apparatus of the second embodiment in a state wherein the apparatus is attached to the distal end of the robot arm.

In the second embodiment described above, the single fitting hole 28 is formed in the substrate 30, and the single pin 22 is inserted and held by the holding member 20. However, the present invention is not limited to a fitting operation of a single shaft, but can be applied to a case of two shafts, i.e., wherein two pins 22 inserted and held by the holding member 20 are to be fitted in two fitting holes 28 formed in the substrate 30, respectively, as shown in a modification of the second embodiment in FIGS. 12 and 13.

In the second embodiment, in the case of two shafts, if a line segment $l_1$ connecting the centers of two pins 22 and a line segment $l_2$ connecting two fitting holes 28 are offset to be parallel to each other, as shown in FIG. 14A, offset amounts $\Delta x$ along the x-axis and offset amounts $\Delta y$ along the y-axis are equal to each other at the contact portions of the pins 22 and the tapered surfaces 32 of the fitting holes 28. Thus, this state can be satisfactorily coped with without rotating the hand body 16 with respect to the robot arm 10 like in the prior art.

However, as shown in FIG. 14B, when the line segment $l_1$ connecting the centers of two pins 22 and the line segment $l_2$ connecting two fitting holes 28 are offset to intersect at a predetermined angle $\Delta \theta$, the offset amounts $\Delta x$ along the x-axis and the offset amounts $\Delta y$ along the y-axis are different from each other at the contact portions of the pins 22 and the tapered surfaces 32 of the fitting holes 28, and the hand body 16 is rotated through ($\theta$) with respect to the robot arm 10. In this case, in the second embodiment, since the rotational position of the second shaft member 134b is freely set with respect to the first shaft member 134a, it cannot be deviated and recovered to have a compliance with respect to such rotation ($\theta$).

However, in this modification, since the compliance unit has the following arrangement, the offset of the two shafts can be reliably coped with.

In the compliance unit 134 of this modification, the diameter of each support pin 134e is set to be considerably smaller than the diameter of the first and second shaft members 134a and 134b unlike the arrangement of the second embodiment. Six V-grooves 134m are formed at equal angular intervals in each of the end portions of the first and second shaft members 134a and 134b to extend vertically in correspondence with the number of support pins 134e, as best illustrated in FIG. 13.

Since the support pins 134e are supported to be fitted in the V-grooves 134m formed in the first and second shaft members 134a and 134b, the relative angular positions of the first and second shaft members 134a and 134b are elastically defined. As a result, a compliance when the unit 134 is deviated to shift an angle in the horizontal plane (x-y plane) occurs as well as the compliance in the second embodiment. In this manner, even if a shift in angle ($\theta$) about the z-axis occurs, the compliance unit 134 can provide the compliance corresponding to the shift in angle ($\theta$).

In this modification, a pair of lock mechanisms 138 are disposed at symmetrical positions to have the central axis of the robot arm 10 as the center in order to provide a rotation lock function of the second shaft member 134b.

As described above, in the modification of the second embodiment, the alignment apparatus 100 has compliances for offset along the x- and y-axes, an offset ($\theta$) in the rotational direction about the z-axis, and an inclination ($\alpha$) with respect to the z-axis. The apparatus can be flexibly deviated with respect to an oblique offset, and when an offsetting force caused by the oblique offset is canceled, can be recovered to an original aligned state. In this manner, even if an offset occurs in a fitting operation of two shafts, the fitting operation can be reliably executed without posing a problem.

The alignment operation in the case of two shafts can be similarly applied to a case wherein a member to be fitted in the case of one shaft does not have a circular section but a polygonal section.

In this manner, the compliance unit 134 has compliances for an offset ($\theta$) in the rotational direction about the z-axis and an inclination ($\alpha$) with respect to the z-axis. When the robot arm 10 is laterally moved so that a pin is fitted in a horizontal fitting hole, even if the central axis of the fitting hole is offset to form a predetermined angle with the horizontal direction, the unit 134 can be flexibly deviated in correspondence with this offset.

A third embodiment of an alignment apparatus according to the present invention will be described hereinafter with reference to FIGS. 15 to 18B.

Figure 15:
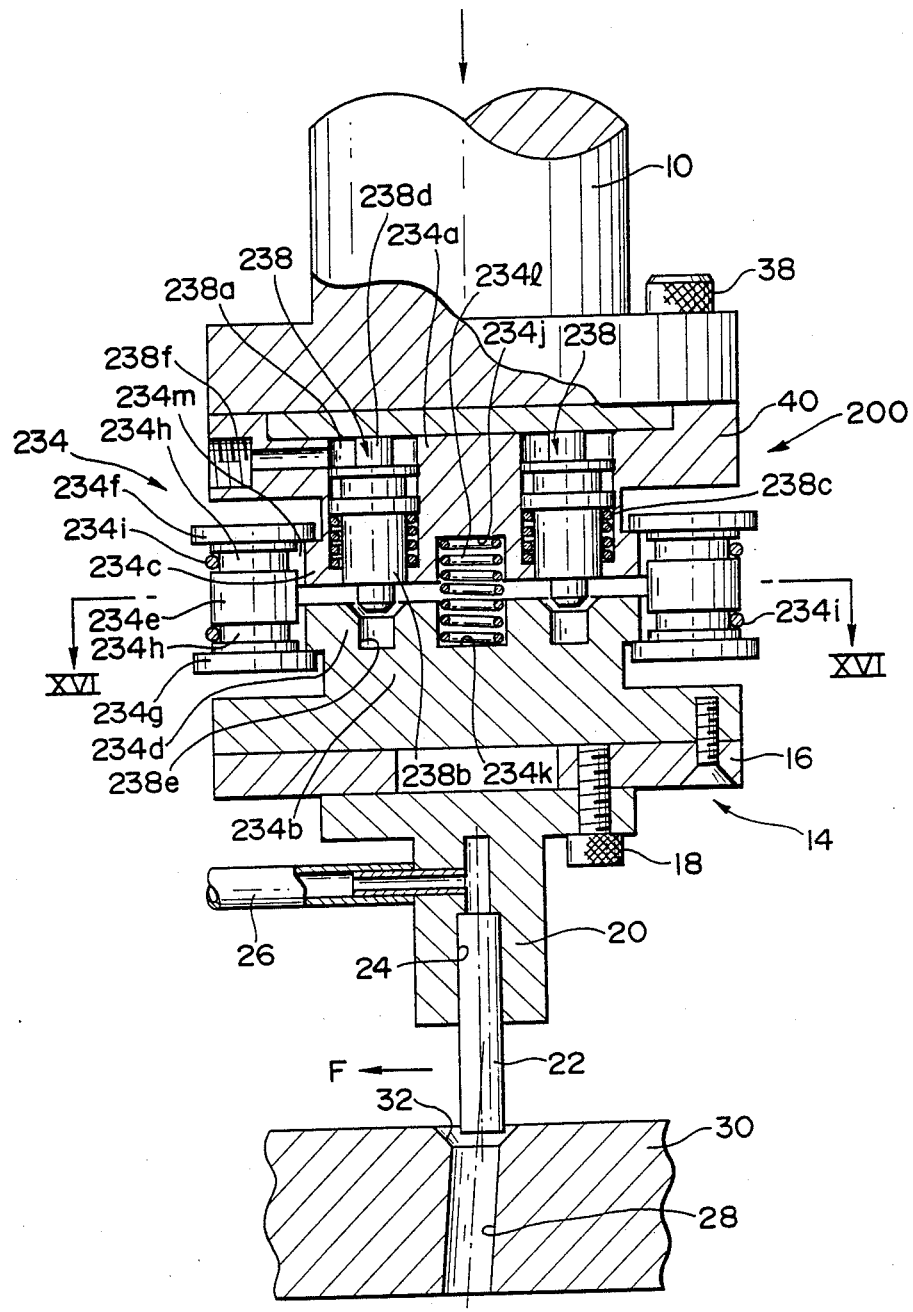
FIG. 15 is a longitudinal sectional view showing an arrangement of a third embodiment of an alignment apparatus according to the present invention in a state wherein the apparatus is attached to the distal end of a robot arm.

FIG. 15 shows a state wherein a hand portion 14 is attached to the distal end of a robot arm 10 constituting a part of an automatic assembly apparatus through an alignment apparatus 200 of the third embodiment like in the first and second embodiments mentioned above. The alignment apparatus 200 of the third embodiment comprises a compliance mechanism 234 disposed to have a central axis coaxial with the central axis of the robot arm 10.

The compliance mechanism 234 is arranged as follows. That is, when no external force is applied to a holding member 20 in a normal state, the mechanism 234 elastically maintains a state wherein the central axis of the robot arm 10 is aligned with the central axis of a holding member 20 in the vertical direction. When an external force in a horizontal plane acts on the holding member 20, the mechanism allows flexible deviation in the horizontal plane within a predetermined range in accordance with the external force.

The arrangement of the compliance mechanism 234 as the characteristic feature of the third embodiment will be described hereinafter.

More specifically, the compliance mechanism 234 comprises a first shaft member 234a which is integrally formed on the lower surface of a mounting body 40 fixed to the lower end of the robot arm 10 to be coaxial with the central axis of the robot arm 10 and to extend downward. A second shaft member 234b is fixed to the upper surface of a hand body 16 through a bolt 18 to be coaxial with the central axis of the holding member 20 and to project upward. The opposing end portions of the first and second shaft members 234a and 234b oppose each other to be separated at a predetermined distance.

Outer flange portions 234c and 234d are integrally formed on the lower end of the first shaft member 234a and the upper end of the second shaft member 234b, respectively.

The compliance mechanism 234 comprises a plurality of support pins 234e arranged to simultaneously surround the opposing end portions of the first and second shaft members 234a and 234b.

Each support pin 234e comprises outer flanges 234f and 234g at its upper and lower end portions, respectively. More specifically, each of the outer flanges 234f and 234g of each support pin 234e is formed of a columnar body having a radius considerably smaller than that of the first and second shaft members 234a and 234b, and the flanges 234f and 234g each number six.

Figure 16:
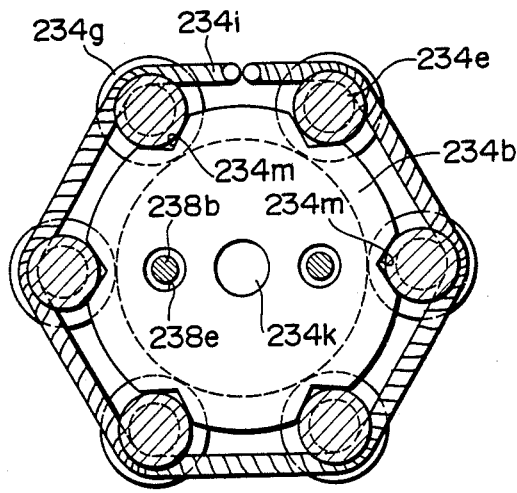
FIG. 16 is a cross-sectional view taken along a line XVI—XVI of the alignment apparatus shown in FIG. 15.

A plurality of vertical V-grooves 234m are formed at equal angular intervals on the outer surfaces of the outer flange portions 234c and 234d of the first and second shaft members 234a and 234b in correspondence with the number of pins 234e, as shown in FIG. 16. The support pins 234e are supported and fitted in the corresponding V-grooves 234m. In this manner, the position of the second shaft member 234b relative to the first shaft member 234a is elastically defined. An annular groove 234h is formed in the outer surface of each support pin 234e, except for the outer flanges 234f and 234g.

The outer flange 234f integrally formed on the upper end of each support pin 234e is engaged from the above with the outer flange portion 234c of the first shaft portion 234a, and the outer flange 234g integrally formed on the lower end of each support pin 234e is engaged from the above with the outer flange portion 234d of the second shaft member 234b. In this manner, the hand body 16 is suspended from the mounting body 40 of the compliance mechanism 234 to be pivotal about the central axis.

As shown in FIG. 16, in a state wherein these support pins 234e surround the shaft members 234a and 234b, ring-shaped biasing members 234i for biasing these support pins 234e to be elastically pressed against the circumferential surfaces at the opposing end portions of the first and second shaft members 234a and 234b are respectively housed in the grooves 234h to simultaneously surround these support pins 234e like in the second embodiment described above. In the third embodiment, each biasing member 234i is formed of a ring-shaped coil spring having a large number of turns.

As shown in FIG. 15, opposing recesses 234j and 234k are respectively formed in the lower surface of the first shaft member 234a and the upper surface of the second shaft member 234b. A coil spring 234l is disposed while its upper and lower ends are housed in these recesses 234j and 234k, respectively. The coil spring 234l is arranged to bias the first and second shaft members 234a and 234b to be separated from each other.

As shown in FIG. 15, the alignment apparatus 200 comprises a lock mechanism 238 for preventing the second shaft member 234b from being laterally deviated with respect to the first shaft member 234a due to its inertia when the robot arm 10 is moved at high speed in the lateral direction. The lock mechanism 238 comprises a pair of cylinder chambers 238a which are formed in the first shaft member 234a at symmetrical positions to sandwich the recess 234j therebetween.

A piston member 238b which can be extendable downward is housed in each cylinder chamber 238a. Each piston member 238b is biased upward by a coil spring 238c. A stopper member 238d is integrally formed on the upper end of each piston member 238b to project upward. At a position where the stopper member 238d abuts against the upper surface of each cylinder chamber 238a by the biasing force of the coil spring 238c, the retracted position of the piston member 238b is defined.

Lock holes 238e in which the distal ends of the corresponding piston members 238b are fitted are formed in the upper surface of the second shaft member 234b at positions corresponding to the distal ends of the piston members 238b. A coupling pipe 238f coupled to a compression pump mechanism (not shown) is connected to a portion of each cylinder chamber 238a above the upper end of the corresponding piston member 238b.

When compressed air is supplied from the compression pump mechanism to the cylinder chambers 238a through the coupling pipes 238f, the piston members 138b are pushed downward from the retracted positions against the biasing forces of the corresponding coil springs 238c, and are deviated to the lock positions. At the lock positions, the lower ends of the piston members 238b are fitted in the corresponding lock holes 238e. When the lock mechanism 238 is actuated in this manner, the first and second shaft members 234a and 234b are locked in the lateral direction, and are laterally moved together.

When the hand portion 14 is attached to the distal end of the robot arm 10 through the alignment apparatus 200 having the compliance mechanism 234 with the above arrangement, a fitting operation for fitting a single pin 22 in a single fitting groove 28 formed in a substrate 30 will be explained below.

The robot arm 10 is controlled and moved by a control mechanism (not shown) so that the pin 22 is fitted in the fitting hole 28 formed in the substrate 30 while the pin 22 is chucked and held by the holding member 20. More specifically, position data of the fitting hole 28 on an x-y plane, and three-dimensional position of the robot arm 10, i.e., the position data of the pin 22 to be fitted are input beforehand in this control mechanism. The robot arm 10 is controlled and moved by the control operation of the control mechanism based on these position data.

When these position data are accurate, the robot arm 10 is moved according to the control content of the control mechanism, and the fitting hole 28 is aligned according to a setting value, the pin 22 is moved to a position immediately above the fitting hole 28, and is moved vertically downward, so that the pin 22 can be reliably fitted in the fitting hole 28.

When the positioning of the fitting hole 28 is not accurate and the fitting hole is slightly offset from the setting value in the x-y plane or when the position of the robot arm 10 is slightly offset from a position defined by the control mechanism due to an error of a drive system, e.g., a backlash of gears, a so-called offset in an oblique direction occurs.

Figure 17:
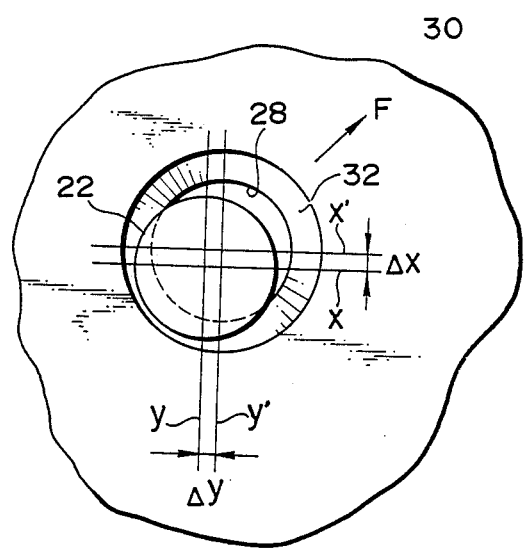
FIG. 17 is a plan view showing an offset state between a pin and a fitting hole on an x-y plane.

If the fitting hole 28 is formed to be obliquely offset although the robot arm 10 side is precisely set, the lower edge of the pin 22 which is moved vertically downward upon downward movement of the robot arm 10 abuts against a tapered surface 32 of the fitting hole 28, as shown in FIGS. 15 and 17. When the robot arm 10 is further moved downward, the lower edge of the pin 22 receives a horizontal partial force F along the tapered surface 32.

Figure 18A:
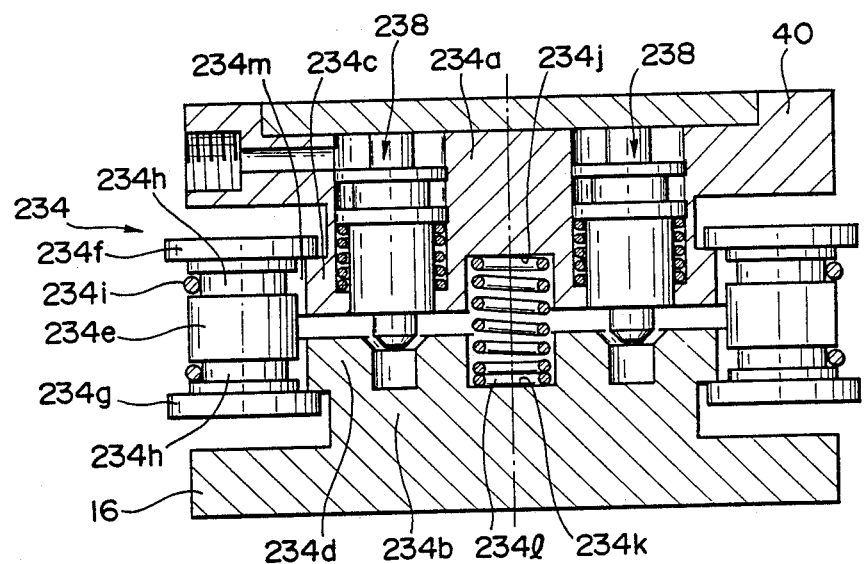
FIG. 18A is a partial front view showing a state wherein first and second shaft members are aligned with each other.
Figure 18B:
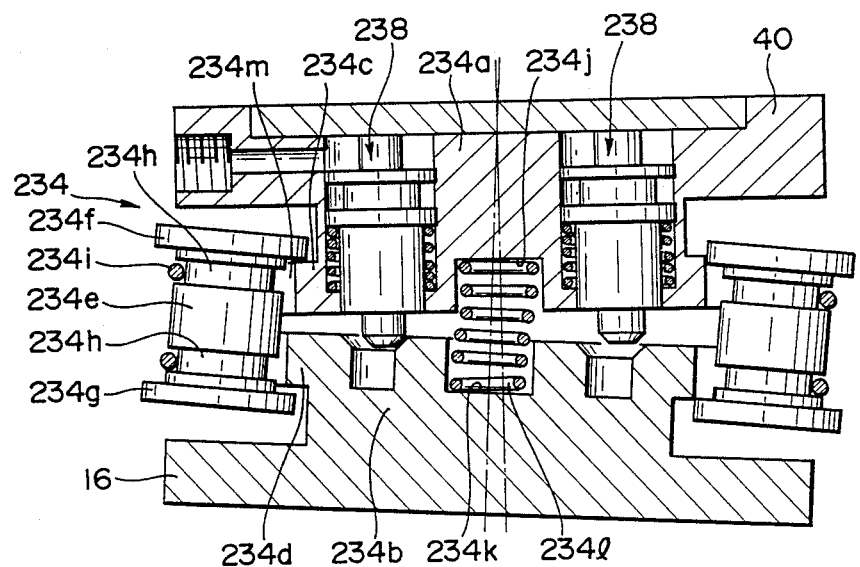
FIG. 18B is a partial front view showing a state wherein the first and second shaft members are deviated from each other so as to absorb an offset between the pin and the fitting hole.

In a state wherein no partial force F acts, the first and second shaft members 234a and 234b are elastically aligned in the vertical direction by the pair of upper and lower biasing members 234i, as shown in FIG. 18A. When the pin 22 receives the horizontal partial force F as described above, the partial force F acts on the second shaft member 234b of the compliance unit 234 through the holding member 20 and the hand body 16. From this state, the support pins 234e are obliquely inclined against the biasing force of these biasing members 234i, so that the second shaft member 234b is moved and deviated in the horizontal direction, as shown in FIG. 18B.

In this compliance unit 234, the first and second shaft members 234a and 234b are arranged to be relatively pivotal about the central axis. As a result, the second shaft member 234b can be temporarily flexibly inclined with respect to the first shaft member 234a with respect to an inclination (α) of the fitting hole 28 or the pin 22 from the central axis (z-axis). In this manner, in the compliance unit 234, the inclination (offset) of the fitting hole 28 or the pin 22 from the central axis can be satisfactorily absorbed, and the pin 22 can be reliably fitted in the fitting hole 28.

An oblique offset between the pin 22 and the fitting hole 28 can be absorbed by deviation and inclination of the first and second shaft members 234a and 234b in the compliance unit 234, and the central axis of the pin 22 is aligned with that of the fitting hole 28. Thus, upon downward movement of the robot arm 10, the pin 22 can be reliably fitted in the fitting hole 28.

After the pin 22 is fitted in the fitting hole 28, a suction pump (not shown) is stopped, and the robot arm 10 is moved upward. Then, the holding state of the pin 22 at the holding member 20 is released, and the hand portion 14 alone is moved upward while releasing the pin 22. The above-mentioned partial force F is stopped when the pin 22 is completely separated from the holding member 20. As a result, the partial force acting on the second shaft member 234b of the compliance unit 234 is canceled, and the second shaft member 234b is recovered by the biasing forces of the pair of upper and lower biasing members 234i from a deviated state shown in FIG. 18B to an aligned state shown in FIG. 18A.

In this manner, the alignment operation in the alignment apparatus 200 of the third embodiment, i.e., the elastic deviation/recovery operation in the compliance mechanism 234 is completed.

Since the coil spring 234l is arranged, the compliance mechanism 234 has a compliance for the vertical direction (z-axis). For this reason, when the pin 22 is inserted in the deepest portion of the fitting hole 28, if the depth of the fitting hole 28 is smaller than a setting value or the length of the pin 22 is large, an offset from the setting value can be reliably absorbed since the coil spring 234l is elastically contracted. Thus, the fitting operation can be reliably executed without applying a shock to the robot arm 10 by the compliance for the z-axis.

As described above, since the support pins 234e are supported to be fitted in the V-grooves 234m formed in the first and second shaft members 234a and 234b, the relative angular positions of the first and second shaft members 234a and 234b are elastically defined. As a result, a compliance when the unit 234 is deviated to shift an angle in the horizontal plane (x-y plane) is obtained. In this manner, even if an offset (θ) about the z-axis occurs, the compliance unit 234 can provide the compliance corresponding to this offset (θ).

As described above, the alignment apparatus 200 of the third embodiment can be deviated to have compliances in correspondence with an offset (θ) in the rotational direction about the z-axis and an inclination (α) with respect to the z-axis as well as offset along the x-, y-, and z-axes. When a partial force caused by these oblique offsets or the like is canceled, the apparatus can be reliably recovered to an original aligned state.

As many apparently widely different embodiments of the present invention can be made without departing from the spirit and scope thereof, it is to be understood that the invention is not limited to the specific embodiments thereof except as defined in the appended claims.

What is claimed is:

1. An alignment apparatus interposed between a machine body and a terminal body attached along a central axis to the machine body and performs alignment therebetween, comprising:
 a mounting body to be connected to the machine body, said mounting body having a surface opposing the terminal body;
 a first shaft member extending from said opposing surface of said mounting body;

a second shaft member to be connected to a surface of the terminal body facing said mounting body, said second shaft member being coaxial with said first shaft member;

a plurality of pin members disposed around said first and second shaft members to surround said first and second shaft members; and compression means for applying a tightening force to said plurality of pin members.

2. The apparatus according to claim 1, wherein said first and second shaft members, said pin members, and said compression means define a single compliance unit, and a plurality of compliance units are disposed on a concentric circle coaxial with said mounting body and the terminal body.

3. The apparatus according to claim 2, further comprising permitting means for permitting a deviation between said first and second shaft members, wherein said permitting means includes:

a portion defining a recess formed in one of either said opposing surface of said mounting body and the opposing surface of the terminal body;

a shaft portion extending from the other one of said mounting body and the terminal body, and being inserted in the recess; and a bearing for axially supporting said shaft portion along a direction perpendicular to the extending direction of the central axis.

4. The apparatus according to claim 2, further comprising lock means, arranged on the concentric circle, for locking said mounting body and the terminal body.

5. The apparatus according to claim 2, further comprising bearing means for causing said first and second shaft members to be separated at a predetermined distance and permitting a deviation of said mounting body and the terminal body.

6. An alignment apparatus interposed between a machine body and a terminal body attached to said machine body and performs alignment therebetween, comprising:

a first shaft portion to be connected to the machine body;

a second shaft portion to be connected to the terminal body;

a plurality of pin members disposed to surround outer surfaces of said first and second shaft portions; and compression means for applying a tightening force to said pin members, with the force being applied toward the center of said first and second shaft portions.

7. The apparatus according to claim 6, further comprising lock means for locking the machine body and the terminal body, wherein said lock means includes:

said first and second shaft portions having holes therein defined;

a lock member arranged within the holes; and locking means for allowing said lock member to be movable in the holes in a nonlock state, and for locking said lock member to one of said first and second shaft portions in a lock state.

8. The apparatus according to claim 6, further comprising axial support means for axially supporting said pin members, said axial support means being disposed between said pin members and either of the machine body and the terminal body and permitting separation and deviation between the machine body and the terminal body.

* * * * *